US012614154B2

(12) United States Patent
Do et al.

(10) Patent No.: US 12,614,154 B2
(45) Date of Patent: Apr. 28, 2026

(54) COHORT-BASED COMPLETION TIME INFERENCING USING MACHINE LEARNING

(71) Applicant: INTUIT INC., Mountain View, CA (US)

(72) Inventors: Bao Do, Ontario (CA); Hanam Dinh Do, San Diego, CA (US); Sangeetha Uthamalingam Santharam, San Diego, CA (US); Ruben Lopez, Poway, CA (US); Jessica Brannam, Escondido, CA (US)

(73) Assignee: Intuit Inc., Mountain View, CA (US)

( * ) Notice: Subject to any disclaimer, the term of this patent is extended or adjusted under 35 U.S.C. 154(b) by 157 days.

(21) Appl. No.: 18/434,343

(22) Filed: Feb. 6, 2024

(65) Prior Publication Data
US 2025/0252405 A1     Aug. 7, 2025

(51) Int. Cl.
G06Q 10/10        (2023.01)
G06Q 10/04        (2023.01)
G06Q 10/1091      (2023.01)

(52) U.S. Cl.
CPC ......... G06Q 10/1091 (2013.01); G06Q 10/04 (2013.01)

(58) Field of Classification Search
CPC .. G06Q 10/1091; G06Q 10/04; G06Q 20/102; G06Q 20/0457; G06Q 20/14; G06F 16/2379
See application file for complete search history.

(56)                References Cited

U.S. PATENT DOCUMENTS

2021/0035044 A1*    2/2021  Volkov ............... G06Q 10/0633

* cited by examiner

*Primary Examiner* — Rokib Masud
(74) *Attorney, Agent, or Firm* — Patterson + Sheridan, LLP

(57)                ABSTRACT

As disclosed herein, machine learning model inferencing is used to make inferences about completion times for processes and stages of processes using a cohort-based approach in which a machine learning model infers a cohort completion time based on a cohort of client entities for which the process or stage has been completed. A primary entity may also be provided with a comparison of a completion time for a secondary entity and an inferred cohort completion time. Also, an estimated completion time for a secondary entity may be based on an inferred cohort completion time. A celebration, reward, or other feedback may be provided based on a comparison of an actual completion time for a process for an entity and an inferred cohort completion time for the process. Tooltips or instruction may be provided to a primary user for stages of a process having lengthy inferred cohort completion times.

20 Claims, 6 Drawing Sheets

210

INFORMATION GATHERING

220

ACTIVATION

230

USER TRACKING

240

CELEBRATION

COHORT-BASED COMPLETION TIME INFERENCING USING MACHINE LEARNING

INTRODUCTION

Aspects of the present disclosure relate to inferencing completion times for stages of processes using cohort completion time information, which may be used to predict an inferred completion time for a process or a stage of a process by a primary or secondary entity and/or to determine a relative speed of completion for the primary or secondary entity.

BACKGROUND

Various lengthy, multi-stage processes exist that that users in execute in many different scenarios regardless of the number of stages or time consuming nature of the process. Examples include applications for jobs, grants, loans, or institutional admittance, health forms, tax forms, application installation or updates, etc. To facilitate allotment of an appropriate amount of time, to motivate a user to complete the process, for convenience, or for many other reasons, processes with many steps can sometimes have a completion time estimate or completion progress estimate provided to a user. However, for processes with many steps, or for processes which are sensitive to attributes of the entity performing the process or for which the process is performed, it may be difficult or impossible to automatically generate a precise and accurate estimate of completion time or completion progress for a particular user with traditional methods.

In some cases, it may be a normal practice for experts at completing a process to perform the process on behalf of another entity or user. In this case, it may nonetheless be similarly difficult or impossible using traditional methods to automatically predict an accurate and precise completion time for the expert to complete the process for different clients with different attributes.

Traditional automated time estimates are generally based on how much of a process has been completed (e.g., how many steps, how many screens, etc.) and, conversely, how much of the process remains. Such techniques lack precision and do not account for a large number of factors that affect completion times. Thus, techniques are needed that improve accuracy of automated time estimates for processes or stages of processes.

BRIEF SUMMARY

Certain embodiments provide a computer-implemented method for cohort-based completion time inferencing and/or rewarding using machine learning ("ML"). In some embodiments, a method inferencing completion times is disclosed, comprising receiving a primary entity data and a cohort entity data set, the primary entity data including data about a primary entity of a process, and the cohort data set including data about a cohort determined based on having a common attribute with the primary entity and based on having a cohort completion time associated with at least a part of the process; providing the cohort entity data set and an indication of the process to a machine learning model trained to determine cohort completion times based on input entity and process information; receiving, from the machine learning model, an inferred cohort completion time for the process; and displaying a time based on the inferred completion time in a user interface associated with an application configured for facilitating completion of the process.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
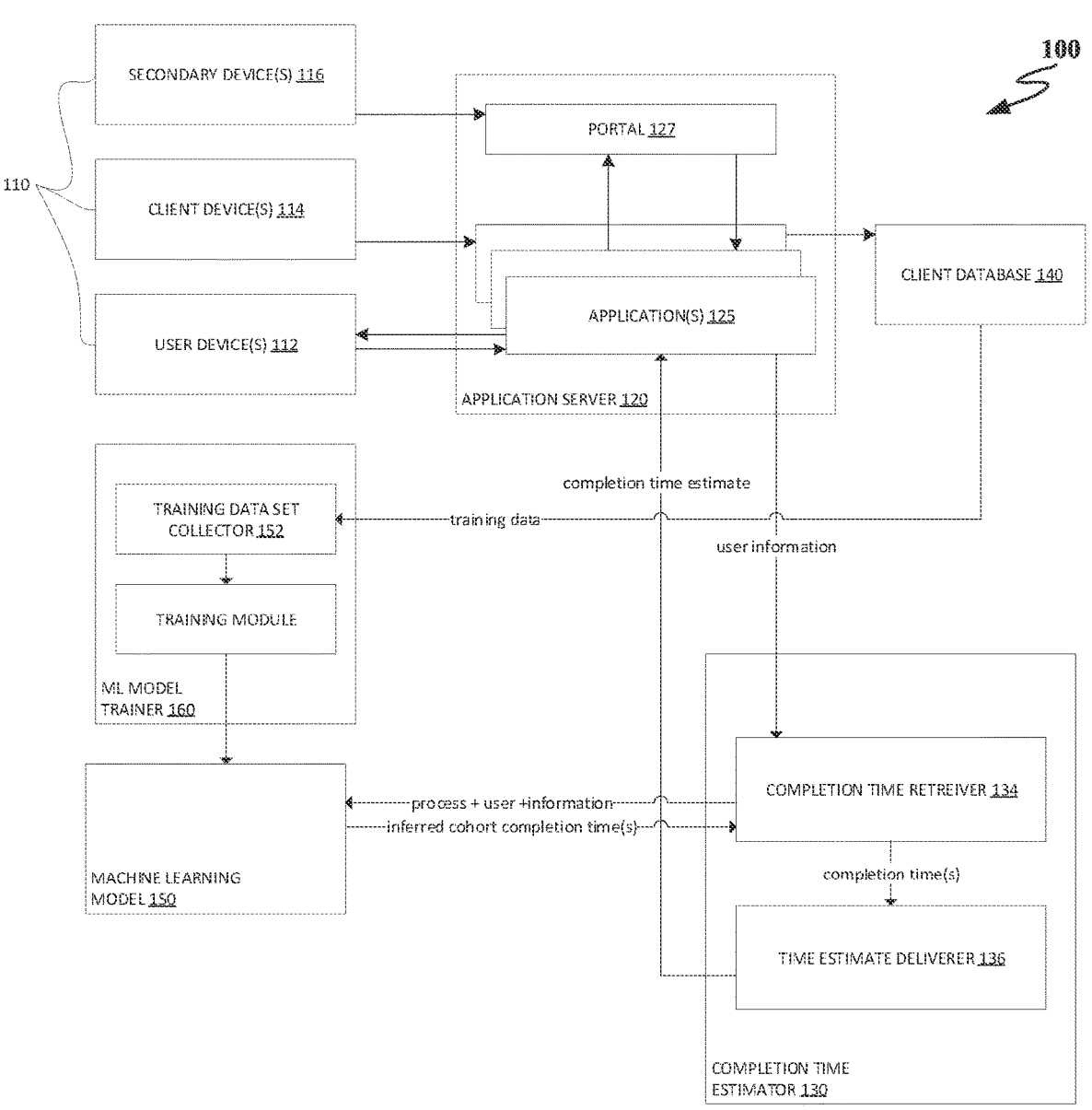
FIG. 1 illustrates an example computing environment for cohort-based completion time inferencing and/or rewarding using machine learning, according to various embodiments.

Unlike traditional automated time estimation techniques that do not consider differences among entities and other contextual information, methods disclosed herein account for various characteristics or parameters associated with entities performing a process. In some cases, many clients may have previously completed a process. Thus, previous client users may be identified that are cohorts to a particular user or entity. The completion times for the cohorts as well as other attributes of the cohorts and attributes of the user can be provided to a machine learning model ("ML model") to automatically generate a completion time based on the cohorts that is more accurate than traditional automated completion time estimates. In this way, the completion times for cohort users can inform an automated estimate of a completion time for a current user via machine learning, resulting in more accurate estimates.

In some embodiments, a secondary user or entity, such as an expert user or someone acting as an agent, may be performing the process on behalf of a primary entity. In this case, an estimated completion time for the expert or agent may be inferred using a model trained with cohort information for entities that are cohorts to the primary entity. In various embodiments, various features facilitate celebration, feedback, progress tracking, and/or prompting being provided to a user device and/or expert device based on automatically inferred completion times.

Information about a primary user is collected in a variety of ways, such as by being input or imported. Information about previous users may also have been previously gathered, collected, and used as training data to train an ML model to infer completion times based on cohort attributes and cohort completion times. Based on information about a current user and information about the previous users, one or more previous users who may be considered cohorts of the current user can be identified. Since the cohorts have previously completed the process, there will also be one or more completion times associated with each cohort. The user information (and/or, in some embodiments, cohort information) can be provided to an ML model that has previously been trained to infer a completion time of a process for a user based on information about the process, the user, and the cohorts. In some embodiments, the ML model identifies cohorts (e.g., explicitly or implicitly via its processing that is based on training data comprising cohort information) based on user information, while in other embodiments cohorts are identified based on user information prior to providing input to the ML model, and the user information is provided along with cohort information to the ML model.

The ML model may be used to infer completion time estimates for an entire process and/or for different stages of a multi-stage process. In cases, some cohorts may have completed some stages or elements of a process but not others. The ML model may provide an estimate for each stage of the process based on the cohorts who have completed that stage. In addition to providing a completion time estimate, the ML model may also be used to identify problematic stages or processes with anomalous cohort completion times or with one or more cohort completion times significantly above an average completion times (for example, one standard deviation above an average time, or a longer or shorter time). By identifying such stages, custom notices or tooltips may be automatically provided to a user to warn about or provide encouragement or instruction for the longer or more problematic or difficult stage or component, and/or to celebrate completion of the stage or component.

In certain embodiments, the ML model is used to generate an estimated completion time for a secondary user, such as an expert or agent that completes a process for a primary user, to be provided to the primary user. In such cases, the cohorts used to generate the estimated completion time may be other secondary users that have completed the process for previous client users. For example, the inferred completion time for the process may be based on attributes of the process, the information about the user, and the completion times for experts that have completed the process for cohort users. In embodiments, a comparison between an actual completion time for stages of a process for a particular expert user (e.g., completing the process for the primary user) and the inferred completion can be provided to the primary user, so that the primary user can see, for each stage, whether the secondary user has completed the stage more quickly or more slowly than the inferred expert completion time.

Methods disclosed herein may enable automated completion time inferences that account for differences between entities to result in more accurate estimates. Additionally, in some embodiments, by automatically determining completion time estimates using cohorts, as opposed to determining completion times based only on data related to an individual user, techniques described herein allow for an ML model to produce a more accurate completion time estimate than possible with traditional methods for a user, even when little or no data about that user's historical completion times is available. Accordingly, techniques described herein improve the functioning of ML models and/or the accuracy of the automated completion time estimates produced by such ML models by differentiation of users from one another based on electronic data, identification of cohorts based on the electronic data, and utilization of electronic data of cohorts to improve automated completion time estimates.

Example Computing Environment for Cohort-Based
Completion Time Inferencing Using Machine
Learning FIG. 1 illustrates an example computing environment 100 for cohort-based completion time inferencing and/or rewarding using machine learning, according to various embodiments. In FIG. 1, the computing environment 100 includes various computing devices 110, an application server 120, a completion time estimator 130, a client database 140, and an ML model 150. In the example shown, the application server 120 is in communication with a client database 140, a completion time estimator 130, and/or a machine learning module 150. However these are not necessarily separate components.

The computing devices 110 can include user devices 112 or other primary entity devices, or client devices 114, expert user devices or other secondary devices 116, and/or other types of computing devices that can access the application server 120. In other embodiments, however, computing devices 110 may execute applications locally rather than by accessing an application server, and the applications may transmit data from the computing device 110 to the completion time estimator 130.

In the example, user devices 112 include devices used to access an application 125 that enables the user to complete a process via the application 125. The application 125 may include or be used to access a completion time estimator 130. In various embodiments, the application 125 provides information from the user device 112, such as information input by a user or gathered from a user history, account history, and/or session history. In some cases, an application 125 can access user information or account information from other applications hosted at the application server 120 to provide detailed user information to the completion time estimator 130.

In FIG. 1, client database 140 can be used to store client data. Based on similarity to a particular user, clients described in the client data may be identified as cohorts for that user. Client data for the cohorts can be selected from the client database 140. In some cases, the cohort data may be anonymized and/or aggregated. In certain embodiments, client data from client database 140 is used to train ML model 150, and cohorts are identified within ML model 150 (e.g., implicitly as a result of the model identifying patterns among the user data from different users).

In some cases, the user of the user device 112 is the object of the process. However, one or more expert devices 116 may also be used to complete a process. In such cases, the process may have another user that is a primary user, such as a user of a user device 112, as the object of the process, with the user of the secondary device 116 acting as an agent of the primary user.

In embodiments, the secondary devices may be used to access a portal 127. The portal 127 enables an expert or other type of secondary user to access the process and complete a process on behalf of a primary user. The portal 127 enables the secondary devices 116 to access and complete a process having a primary user or user device 112. By way of example, the portal 127 thus enables access for facilitating completion of a process for a primary user by an expert user.

In embodiments where an expert is completing the process, completion time estimates may reflect estimates determined according to completion times for experts to complete one or more stages of the process for cohorts of the user for the one or more stages. Particular embodiments involve comparisons between one or more current expert times for a primary user to one or more times determined by the cohort expert times for experts to complete the same stage or process for a cohort user that is a cohort to the primary user. The comparison may be updated in real-time and transmitted to the application 125 and provided to the primary user, such as by being displayed on a display of a user device 112. A feedback mechanism may be included for the primary user to provide feedback to an expert, such as via the secondary device 116.

In embodiments where there is a secondary entity, such as an expert user, an event listener can be executed by an application at the portal 127 to determine when a component or section of a process or stage for a primary entity is completed, and updated progress may be available after each of one or more events to a user via user device 112. Thus, completion time updates may be maintained even when a user is offline, and a user device 112 may disconnect from the application server 125 and reconnect to the server 125 later to receive updated information such as: updated completion times for stages, components or a process, updated completion time estimates for stages, components, or the process, a total completion percentage, and/or one or more remaining completion times, etc. In embodiments where a secondary entity or account, such as an expert user account, is used to complete the process, a notification may be provided to a primary user device 112 after the event listener determines an event has occurred corresponding to completion of a section, component, or stage of a process.

Regardless of whether there is a secondary user, information about a primary user or about user device 112 is provided to the completion time estimator 130. A completion time retriever 134 receives the user information and/or an indication of the process being performed and provides the user information and/or the indication of the process to the ML model 150. The ML model 150 may determine an inferred completion time for the primary entity based on a completion time for an entity determined to be a cohort to the primary entity. In some cases, many cohorts can be determined. In embodiments, client information may be used to extrapolate percentile completion times for cohorts from the client information.

The completion time retriever 134 provides the user information to the ML model 150. In various embodiments, the ML model 150 may have been previously trained to infer a completion time for a process for a user based on an indication of the process, input cohort information, and/or input user information. In embodiments, the completion time retriever 134 may retrieve cohort information or additional cohort information from the client database 140 and provide the information to the machine learning model 150. In some cases, the completion time retriever 134 may make a selection of data from the client database based on clients having one or more shared attributes with a primary entity based on the user data and the data stored in the client database 140.

The ML model 150 determines one or more inferred cohort completion times from the input and provides the one or more inferred completion times to the completion time retriever 134. The completion time retriever 134 provides the one or more inferred completion times output by the ML model 150 to the time estimate deliverer 136.

The time estimate deliverer 136 transmits one or more completion time estimates to an application 125. The time estimate may include percentile time estimate, or may be an aggregate or sum of time estimates for multiple stages or for multiple cohorts. Various time estimate or values based on time estimates may be provided to a user, such as by being displayed on display of a user device 112. In various embodiments, a process may include multiple stages and a separate completion time estimate for each stage may be provided to a user or user device 112, so that a user may be informed as to whether the user is over-performing or under-performing for each or any stage, in terms of completion time. The application 125 may also perform a comparison of the user completion time and the inferred completion time to determine whether to provide celebration, reward, encouragement, or other feedback to the user.

In some embodiments, the time estimate deliverer 136 delivers a time that is based on a time for a secondary user to complete a process for a cohort of the primary user. For example, an inferred completion time may represent an expected time for an expert to complete the process based on times for experts to complete the process for a cohort. The inferred completion time and the actual completion time can be provided to a primary user to inform the user of the timeliness of the expert completion of the process. Moreover, processes may be divided into stages, so that a user may be updated on a stage-by-stage basis whether the expert performing the stage over-performed or under-performed for each or any stage. This comparison may be used to facilitate celebration, reward, or other feedback by the primary user about or to the expert, such as by enabling a user to provide the feedback via a user device 112 to a secondary device 116 in response to receiving a comparison of an actual expert completion time and one or more inferred expert completion times for completing the process for one or more cohorts.

Figure 2:
FIG. 2 illustrates an example workflow architecture for cohort-based completion time inferencing using machine learning, according to various embodiments.
Figure 2:
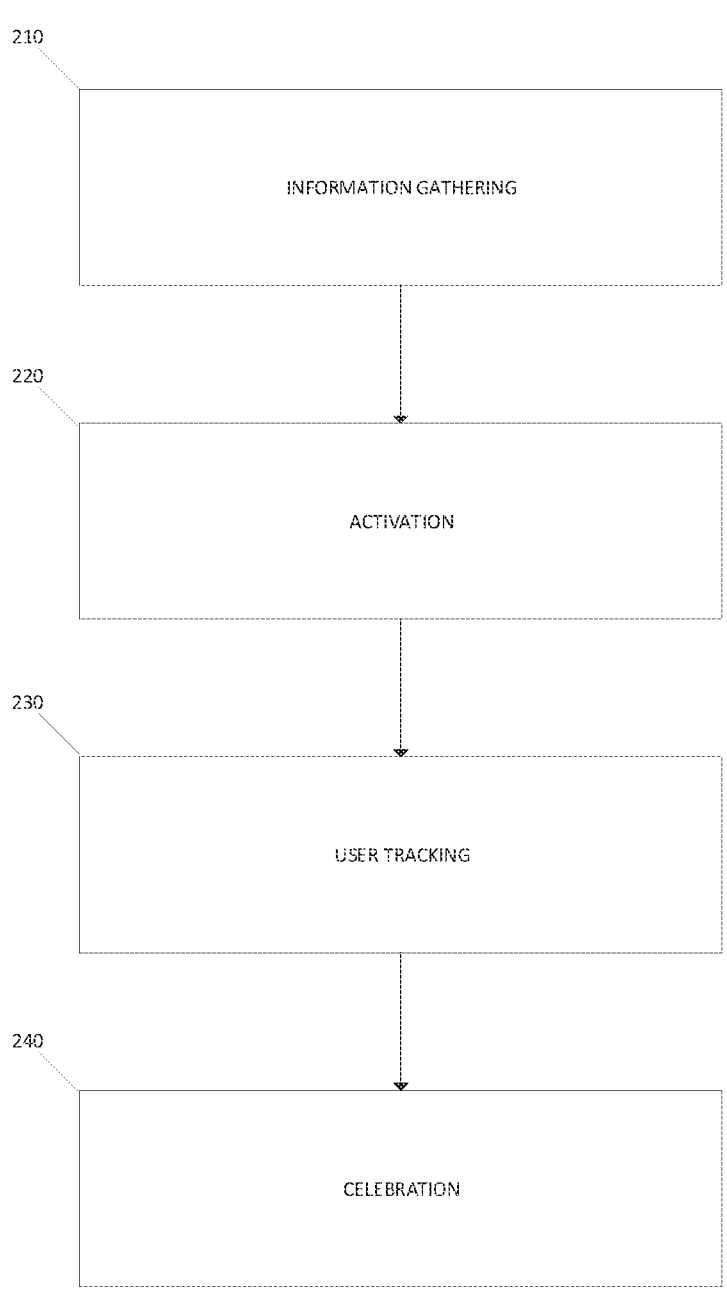

Example Workflow for Cohort-Based Completion Time Inferencing Using Machine Learning FIG. 2 illustrates an example workflow 200 for cohort-based completion time inferencing using machine learning, according to various embodiments. In FIG. 2, the workflow 200 includes an information gathering stage 210, an activation stage 220, a user tracking stage 230, and a celebration stage 240.

The information gathering stage 210 involves gathering of information about a user of an application or other primary entity. For example, a user of an application may be provided with an information gathering template, such as a questionnaire or form, via the application. The answers to the information gathering template may determine which process or which stage or stages of a process the primary entity is to complete using the application. In one example, the primary entity is a user of a tax document preparation application, and the information gathering stage includes providing the user with preliminary questions about their tax situation, such as income, tax status information, and/or other tax-related information.

The activation stage 220 begins once a primary entity initiates a process for which a completion time is recorded and for which an inferred completion time estimate may be provided. In some embodiments, the activation stage begins when a secondary entity begins a process to be completed on behalf of a primary entity. For example, the activation stage may begin when a tax expert begins completing a tax document on behalf of a primary user. Based on the information gathered during the information gathering stage, cohorts that have similar attributes to the primary user can be determined. During this time, a user or expert may be provided with a time estimate for the process, or for one or more stages of the process. Celebrations, rewards, or other feedback or cues can be provided in response to a user or expert completing a stage or process within a threshold time duration or having at least a threshold percentile.

The user tracking stage 230 includes monitoring the primary user or expert for completion of a part, stage, or component of the process. A real time status can be provided with an estimated completion time for remaining stages or components. During the user tracking stage, the completion times for each component or stage of a process for a user or expert may be tracked or otherwise monitored or recorded. During this phase an event listener may be continuously executed by an application to determine when a process or a component of the process is completed. A graphical user interface displaying a percentage towards total completeness may be updated each time an event occurs, such as completion of a section, which indicates progress.

In an example, a process may be preparation of a tax document such as a tax return. Progress tracking during this stage may include listening to events such as completion of all components of a particular tax topic, or completion of a particular section in a tax document. Events such as completion of a personal information section, a wages section, an income section, etc., can trigger an update to progress tracker, such that a user's time and a cohort time at completion of the same section are provided comparatively. In embodiments, the events are then mapped to rules which may be used to calculate a percentage of completion, in some cases based on a completeness graph.

Also, upon completion of an event by a user, a time tracking can be updated as follows: Based on input user data from the completion of the event, a ML model can be used to make a determination of cohorts that are similar to the user and/or infer a remaining time based on a completion time for the cohorts determined based on user data from completion of the event. Additionally, during the tracking stage 230, one or more graphical elements may be generated upon completion of a component, part, or stage of a process by a user to show a comparison of a current time for the user and a cohort time for a cohort after completion of the same component, part, or stage of the process.

The celebration stage 240 includes providing a celebration screen or other interface to the user or expert to provide feedback to the user or expert, such as a reward or celebration of completion or of a fast completion time. Once a celebration screen is provided, the time tracking of the process can be concluded.

In some cases, the celebration stage can include feedback provided by a primary entity or user to a secondary entity or expert user completing the process for the user. In such embodiments, the expert may access the process to be completed via an expert portal. The expert may be provided, via a computing device, with inferred completion time estimates based on completion times for experts to complete the process or stages of the process for cohort users that are cohorts to the primary entity for which the expert is completing the process. Additionally, the primary entity is provided, via a user device, with the actual expert completion time for the process and one or more inferred expert completion times based on cohort user expert completion times. In this way, devices may present a time comparison between an actual time and an inferred time and may be used to send or receive feedback based on this information. The feedback can be stored as a component of a rating for an expert or may be otherwise presented to the expert, for example to provide a means for providing encouragement or expression of dissatisfaction.

Figure 3:
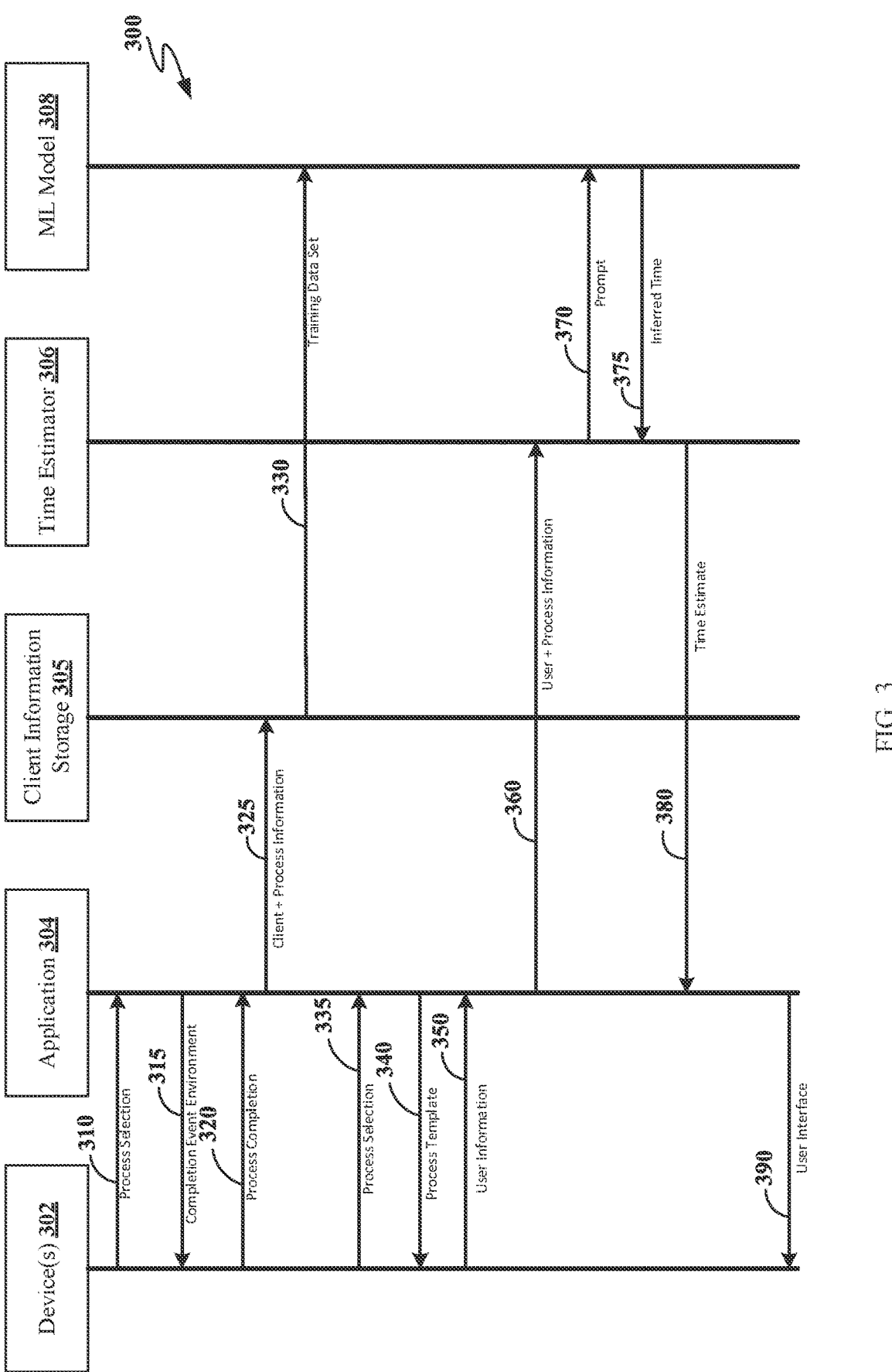
FIG. 3 illustrates an example workflow for cohort-based completion time inferencing using machine learning, according to various embodiments.

Example Workflow for Cohort-Based Completion Time Inferencing Using Machine Learning FIG. 3 illustrates an example workflow 300 for cohort-based completion time inferencing using machine learning, according to various embodiments. In FIG. 3, one or more computing devices 302 are used by one or more clients and a primary entity user to access an application 304 for completing a process and for receiving time estimates for the process. As shown, the application 304 communicates with client information storage 305 and time estimator 306. The time estimator 308 may provide input to an ML model 308 trained using stored client information and may receive a completion time result from the ML model 308. In various embodiments, client information storage 305 is a persistent storage database.

In FIG. 3, the workflow 300 begins at step 310 where a process selection is made. Various processes may be available to be completed using the application 304. In a particular embodiment, the device 302 is used to select and complete a tax return document using the application 304.

Next, the application 304 retrieves a completion event environment for the process at step 315. In various embodiments, a template, form, or other information gathering means for the selected process is also provided to the device 302. At step 315, the completion event environment is received at the device 302. Client information may be entered into the template via the device 302 as a part of an information gathering stage prior to an activation stage which occurs during completion of the process. During step 320, the process is completed by the client and various data and/or information provided by the client is received by the application 304, including information entered into the template, information imported or otherwise input by a client or via a client device, and/or information input by the client during completion of the process. In some embodiments, the application 304 may also receive information associated with an account which may be stored at an application server and/or client database. At step 325, client data received by the application, and information associated with any processes completed by the client, along with any associated account data and/or metadata, is recorded in client information storage 305.

At step 330, the ML Model 308 (e.g., which may correspond to ML model 150 of FIG. 1) is trained based on a training data set comprising client information from the client information storage 305, which includes, for example, client information input via the information collection phase for each client or via a process template, other client information (e.g., user attributes), indications of processes completed by the clients, and completion times for the processes and/or completion times of individual stages of the processes (e.g., the completion times may be used as labels in a labeled training data set). Any number of clients may complete the process and the respective client information may be stored at client information storage 305 and/or provided to the ML model 308.

Training of ML model 308 may be a supervised learning process that involves providing training inputs (e.g., features of clients/users) as inputs to the ML model. The ML model processes the training inputs and outputs predictions (e.g., estimated completion times for processes and/or stages of processes) based on the training inputs. The predictions are compared to the known labels associated with the training inputs (e.g., ground truth labels indicating actual completion times of processes and/or stages of processes) to determine the accuracy of the ML model, and parameters of the ML model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the ML model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for the ML model, such as based on validation data and test data, as is known in the art.

ML model 308 may be re-trained on an ongoing basis as new training data becomes available in an interactive feedback loop. For example, after the ML model is used to generate a completion time estimate, ground truth data may be received indicating an actual amount of time taken to complete a process or stage of the process. The ground truth data may be used to generate updated training data, which may then be used to re-train the ML model in a similar manner to that described above. Accordingly, the ML model may continue to improve over time as additional ground truth becomes available, resulting in improved accuracy for subsequent predictions.

At step 335, a particular user that is a primary entity of a completion time estimate may select a process. An information gathering template for the process is provided to the user at stage 340 during an information gathering stage. Information input by a user or via a user device 302 during the information gathering phase and/or during completion of a process is collected by the application 304 at stage 350. Information about the user may also be retrieved from one or more other sources, such as user account or profile information, and/or the like.

In embodiments, client information is retrieved for other users of the application that have completed the same process or a stage of the process as being completed via the user device 302 that are also determined to have one or more common attributes with the user between the client information and the user information. In this way, additional client data not used in training may be retrieved from a client database and used as context when prompting a machine learning model, or a selection of clients manually identified as cohorts may be provided as context.

The user information received by the application at step 350 and/or other information gathered by the application 304 is provided to the time estimator 306 at step 360. The time estimator 306 generates a prompt or query based on the user and process information. At step 370, the time estimator 306 provides the prompt or query to the ML model 308. The ML model 308 outputs an inferred cohort completion time and/or user completion time based on the user information and the indication of the process.

At step 375, the inferred time is received by the time estimator 306. The time estimator 306 determines a completion time estimate that is based on the inferred time. For example, a plurality of inferred completion times may be received based on cohorts who are cohorts for a different stages or components of a process. Thus, the set of cohorts for one stage of a process may be different than the cohorts for another stage of a process. A total inferred completion time for a process may be based on a sum of inferred completion times for the components and/or stages of a process, each of which may be based on a set of cohorts determined to be cohorts based on having completed the stage or component and based on having some shared attribute with the primary user as identified by the ML model 308.

At step 380, the time estimate is provided to the application. Next, an interface based on the time estimate generated by the application and/or displayed via the device 302. In some cases, the application may transmit a user interface upon completion of any stage of the process based on a comparison between an actual completion time for the primary entity user and an inferred cohort completion time. Example user interfaces may display a selection from: a reward or celebration, a current time elapsed since an activation stage, a target time, a plurality of target times and percentile ranks or tiered rewards, and/or other feedback or prompts, etc.

In embodiments, the interface and content can be selected in a variety of ways based on a comparison of an actual completion time by a user (or expert) to a one or more threshold completion times determined based on the cohort information (for example based on being shorter in duration than an average completion time or in the 70th, 80th, or 90th percentile rank of shortest completion times, etc.). At step 390, a user interface is received by the user device (or provided by an application on the user device). Various infographics, celebrations, or rewards based on a comparison of the actual completion time and one or more completion times inferred based on cohort information may be included in the user interface provided to the user device 302 and step 390. Next, the user interface may output by the device 302, and the workflow 300 may conclude.

Figure 4:
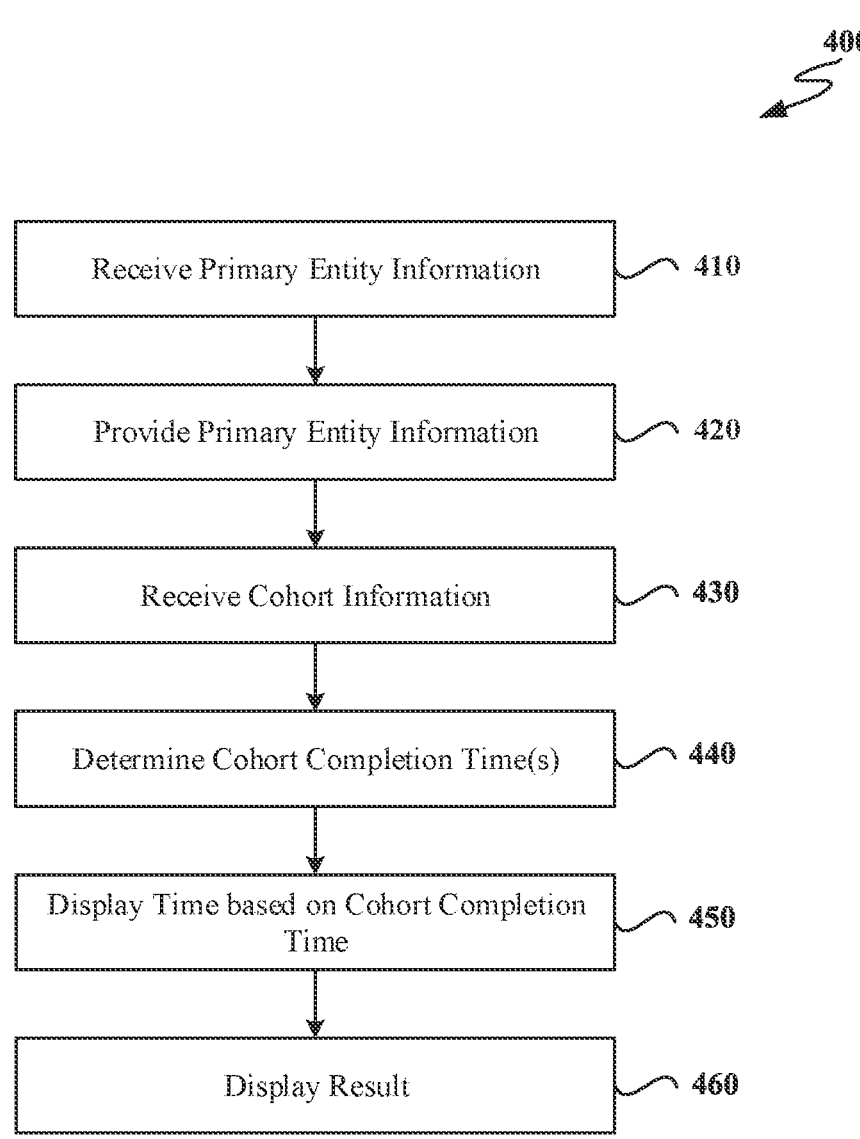
FIG. 4 illustrates an example method for cohort-based completion time inferencing using machine learning, according to various embodiments.

Example Method of Cohort-Based Completion Time Inferencing Using Machine Learning FIG. 4 illustrates an example method 400 for cohort-based completion time inferencing using machine learning, according to various embodiments. In FIG. 4, the method 400 begins at block 410 where primary entity information is received. For example, information about a primary user, account, or device may be received from a user device by an application such as user device 112 and application 125 of FIG. 1. The information and a selection of a process may be provided by a user or user device to the application. In some embodiments, user information can also be imported from other applications or from stored data about the user stored at or accessible to the application server.

Next, the method 400 may proceed to stage 420 where the primary entity information is provided. For example, an application which receives user information and a selection of a process can provide the user information and the selection of the process to a completion time estimator such as completion time estimator 130 of FIG. 1. For generating one or more completion time estimates for a process or a section, stage, or component of the process.

The method 400 may then proceed to stage 430 where cohort information is received. In various embodiments, a completion time estimator provides user information and a selection of a process to a client database to selectively retrieve client information from the client database which represents clients who are cohorts to a primary user. In some embodiments, cohorts are determined based on one or more attributes of the client matching an attribute of the primary user. In embodiments, cohorts are also determined based on having also completed the process to be completed by the user for which a completion time estimate is to be determined, or at least a stage or component of the process.

Next, the method 400 proceeds to stage 440 where a cohort completion time is determined. The cohort information received at stage 430 may be provided to an ML model that has been previously trained to infer a completion time based on a selection of a process or stage of a process and based on cohort information provided to the model. In some embodiments, a cohort completion time for each component or stage of a process can be determined by the model based on providing the cohort information and a selection of the component or stage to the model.

From stage 440 where the cohort completion time is received, the method 400 may proceed to stage 450 where a time based on the cohort completion time is displayed. For example, a primary user may be accessing an application hosted on an application server to complete a particular process. A graphical user interface of the application may include a graphical user interface element generated based on the cohort completion time in a variety of ways. For example, a cohort completion time may be displayed as a time estimate, an estimated time remaining may be displayed that is a countdown timer from the cohort completion time. In some embodiments, multiple cohort completion times can be displayed representing different percentiles of completion speed. In embodiments, the graphical user interface element displaying a time based on a cohort completion time can be displayed until the process is completed.

Next, the method 400 proceeds to stage 460 where a result is displayed. In various embodiments, completion of a process, or of a stage or component of a process can trigger a reward result. A reward result may be based on a difference in time between the cohort completion time and the actual completion time for the user to complete the process. In embodiments, the reward result may be based on the percentile of completion time, such as the relative ranking for the user as compared to a plurality of cohorts and/or other clients. The reward can include a reward screen that is a graphical user interface having a celebratory image, message, or video, award of a digital asset, and/or another type of reward. In some cases, a celebration of completion may be provided without an additional reward if the completion time is above a threshold. Such as threshold may be defined as, for example, being within a specified percentage of (i.e. 150% or 200%) or standard deviation from the inferred cohort time.

In some embodiments, a notification can be sent to a user device after a period of time has expired without an event occurring. For example, a reminder or notice to complete the process or a stage of the process can be transmitted to a user device after a period of time has elapsed since an event listener determines a component of the process has been completed, such as completion of a form element.

In certain embodiments, cohort information provided to an ML model results in inferred completion times for stages or components of a process for which an inference is made that there is a likelihood of the stage or component taking an amount of time that is relatively longer in duration, or perhaps significantly longer in duration, than other components or stages. For example, a user may reach a stage of a process which typically takes cohorts a relatively longer amount of time, such as twice as great or a standard deviation greater in duration. In response to determining a relatively longer cohort time, a prompt or notification can be provided to a user via a banner, window, or pop-up of the application being used to complete the process. The prompt provides a warning message, an encouragement message, and/or another indicator of the proceeding longer stage.

Once a result has been displayed and/or one or more other actions has been taken based on the result, the method 400 may conclude.

Example System Architecture for Cohort-Based Completion Time Inferencing

Figure 5:
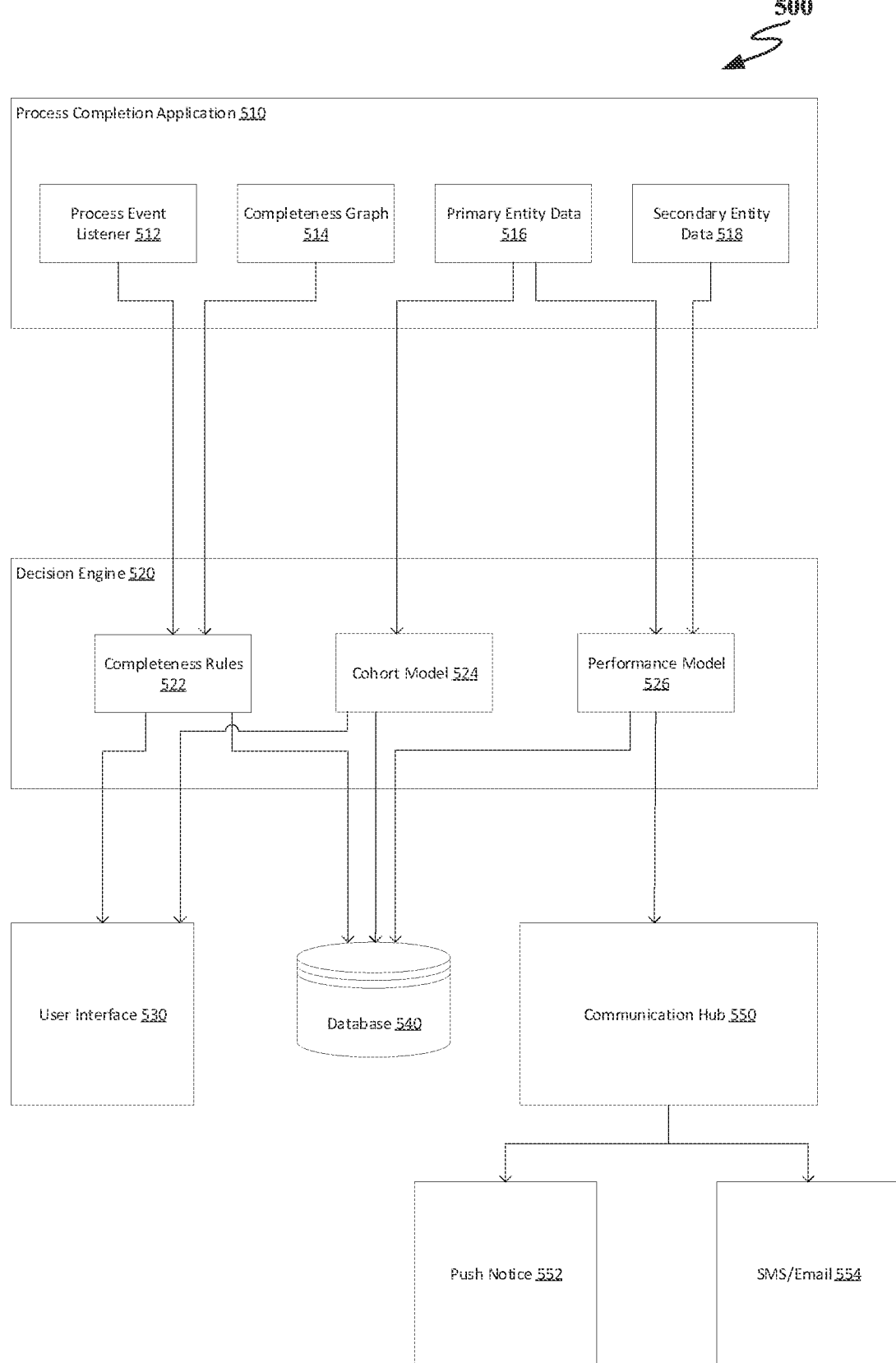
FIG. 5 illustrates an example system architecture for cohort-based completion time inferencing using machine learning, according to various embodiments

FIG. 5 illustrates an example system architecture 500 for cohort-based completion time inferencing, according to various embodiments. In FIG. 5, the system architecture 500 includes process completion application 510, decision engine 520, user interface 530, a database 540, and a communication hub 550.

In the example of FIG. 5, the process completion application 510 includes an event listener 512, a completeness graph 514, client entity data 516 and secondary entity data 518. The process completion application 510 provides data to the decision engine 520, which performs a selection of one or more actions based on information in the received data and via the user interface 530, database 540, communication hub 550, or via another endpoint.

The decision engine 520 of FIG. 5 includes a set of completeness rules 522, a cohort model 524, and a performance model 526. The completeness rules 522 may be applied to the completeness graph 514 to determine a completion percentage for the process. By way of example, one type of process may be a process that is process for completing a tax return document. There may be multiple stages of the process of completing the tax return, each with multiple components or data points. The completeness rules may determine or specify a relative contribution of each data point toward total completeness percentage.

The event listener 512 may detect completion of a component of the process, such as completion of a data point or form element. In a particular embodiment, the process completion application 510 is tax application, a tax document completion engine, or the like. In such embodiments event listener 512 may be a tax application event listener suitable for determining, based on events received from a user device, a current tax topic, a current tax document section, a tax form component, an application workflow location of the application, a tax document type, completed data points, uncompleted data points, unreached data points, and/or the like for a user or instance of the application.

The completeness graph 514 may include a graphical representation of completed and uncompleted data points for processes or for stages of a process. Generally, the completeness graph 514 may be useful for determining how long much time is remaining for a user to complete a process. For example, by combining the information about which data points are completed and not completed with how much time each section or data point is inferred to take, the completeness graph 514 facilitates determining how much time is remaining for a process, stage, or other component.

By applying the completeness rules 522 to the completeness graph 514 and updating a completeness percentage according to events detected by the event listener 512, a real time completeness percentage of the process can be maintained. For example, the business rules 522 may define a weight for each data point or stage of a process for determining completion percentage of the process or of a stage of the process. This completion percentage may be provided via a user interface 530, which may be received by a user device. Percentage completion data may be persistently stored in database 540.

In general, the client entity data 516 refers to data or information about a plurality of primary entities or users who have completed a process, such as by using the application 510. For example, the primary entity may be a user of a tax application that is using the application to complete a tax return. In some cases, the primary entity data refers to a subject of a process being completed by a secondary entity. For example, a primary entity may be a subject of a tax return preparation process being completed by a secondary entity that is an expert at the tax return preparation process. In this way, a user of the application may receive completion time estimates that are based on other users' times in the primary entity data 516.

The secondary entity data 518 includes data related to secondary entities that complete a process for one or more primary entities. The secondary entity data 518 may be provided to an ML model for determining secondary entity completion times based on cohort data for a process and based on historical data for individual secondary entities. For example, the secondary entity data 518 may be data related to a professional or expert, or someone who has otherwise completed the process for a primary entity. In various embodiments, the secondary entity data may include a history of completed process and completion times for the processes, a speed rating, a feedback rating, and/or the like. The secondary entity data 518 may also include, for each process completed by the secondary entity, an identifier for the process (for example, a stock keeping unit ["SKU"] number may be used as an identifier).

In various embodiments, the cohort model 524 may be used to determine, for a particular entity, other entities that are cohorts to the entity. For example, a user of a tax document preparation process application may have other users of the same application that are cohort users based on having one or more matching attributes in common with the user and/or based on having completed the same tax document preparation process using the application. Results of the cohort model, which may include an inferred completion time for a process, may be included in a user interface 130, stored in a database 140, and/or transmitted to another endpoint. In some cases, the client data may include data for a user related to a previous completion of the process by the user. Such data, or other data about a user may be received by the application 510, either by being input by a user or by being imported from a related application or account of the user. In a particular embodiment, user data based on prior tax return or other tax data for the user is imported and provided to the cohort model 524 in addition to other client data. In general, cohorts can be determined by similar or matching values for data input while completing a process, such as completing a tax return using an application.

The cohort model 524 uses attributes of clients and the user to determine clients that are cohorts to the user. The cohort model 524 may use similar or matching values between clients and a user for one or more data points to determine that a client is a cohort to the user. In some cases, the machine learning inferencing may also determine cohorts by comparing clients based on prior tax return data for a user in addition to or in place of current year data. The cohort model 524 outputs a completion time identifying how long it is expected for a client in the cohort to take to complete the process. In some cases, the primary entity data may be used to determine a complexity, and cohorts are determined based on similarity to the primary entity in terms of a matching or similar degree of complexity.

In addition to, or instead of, transmitting a result to the persistent storage 540 or other endpoint, the decision engine 520 may also perform one or more actions via the communication hub 550. For example, the performance model 526 may provide a result in response to an event, such as completion of a process or completion of a stage of the process, being competed by a secondary user. In some cases, a primary user may access the communication hub 550 or the database 540 to access a real-time progress report, such as a progress bar and/or timer, depicting a live progress of the secondary user completing the process for the primary user. However, the communications hub 550 enables for information based on an inferred completion time for the secondary user to be persisted. Further, the communications hub 550 may facilitate communication of information about a secondary user with a user device for a primary user, such as via push notification 552 on a mobile device or an email or short messaging service ("SMS") message 554, or another type or message, notification, or signal to a primary user device.

Figure 6:
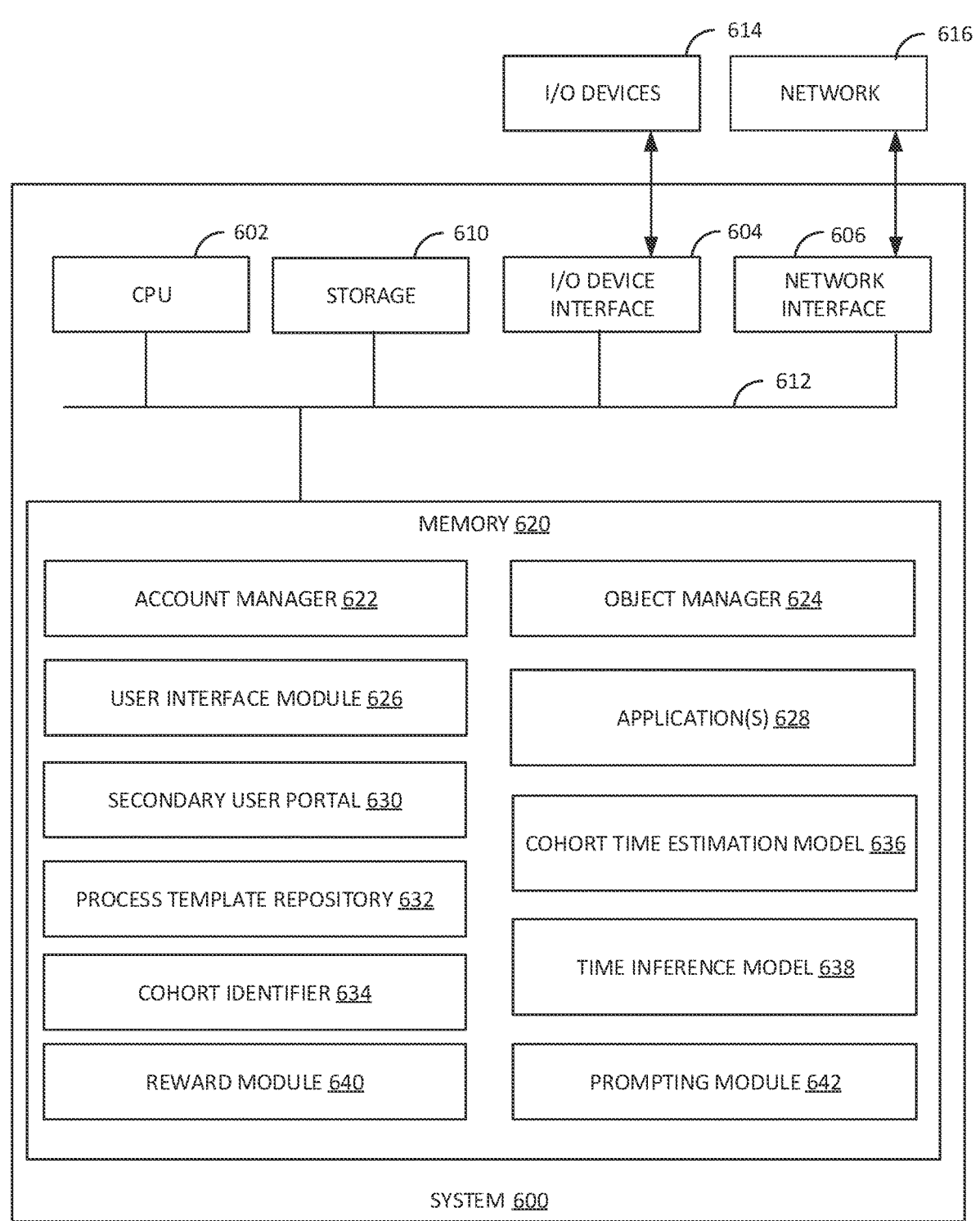
FIG. 6 illustrates an example system on which methods of cohort-based completion time inferencing using machine learning can be performed, according to various embodiments.

Example System for Cohort-Based Completion Time Inferencing Using Machine Learning FIG. 6 illustrates an example system 600 configured to perform the methods described herein, including, for example, method 400 of FIG. 4. In some embodiments, system 600 may act as a completion time estimator, process completion celebrator, or expert service time monitor, as discussed previously with regard to FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 616 (which may be a local network, an intranet, the internet, or any other group of computing devices communicatively connected to each other), a memory 620, storage 610, and an interconnect 612. The I/O devices 614 and/or network interface 606 may be used to receive a query in a natural language utterance through a chatbot application and output a response to the query generated based on extracting operators and operands from the natural language utterance.

CPU 602 may retrieve and execute programming instructions stored in the memory 620. Similarly, the CPU 602 may retrieve and store application data residing in the memory 620. The interconnect 612 transmits programming instructions and application data, among the CPU 602, I/O device interface 604, network interface 606, storage 610 and memory 620.

CPU 602 is included to be representative of a single CPU, multiple CPUs, a single CPU having multiple processing cores, and the like.

Memory 620 is representative of a volatile memory, such as a random access memory, or a nonvolatile memory, such as nonvolatile random access memory, phase change random access memory, or the like. In general, data may be moved or transferred between storage 610 and memory 620. As shown, memory 620 of embodiments may at times include an account manager 622, an object manager 624, a user interface module 626, an admin system 628, an API library 630, a model training system 632, an ML model 634, transaction data 636, a graph representation 638, and a random path generator 640.

In embodiments, the account manager 622 generates, stores, changes, or otherwise manages login or other account information associated with entities such as primary users or secondary or expert users. The object manager 624 of embodiments generates, stores, changes, or otherwise manages object information, for example, processes, documents, forms, information gathering templates, or other files or objects may be managed by the object manager 624. The user interface module 626 generates, stores, changes, or otherwise manages user interfaces, which may for example be displayed on I/O devices 614 via the I/O Device Interface 604 or transmitted to a network location 616 via the network interface 606.

In various embodiments, one or more applications 628 are accessed by a user or expert to complete processes and/or to view a completion time estimate for the process or for stages of the processes. In various embodiments, the applications 628 may import data from other applications or from a client information database to obtain user information and/or client information for identifying cohorts to a user.

In embodiments, the secondary user portal 630 enables a secondary user, such as an expert user, to access the system and complete a process on behalf of another user or a primary user. The secondary user portal 630 can includes various features and frameworks for enabling feedback and other interaction between a user of an application 628 and a user of the portal 630.

In various embodiments, the process template repository 632 includes various forms, templates, or other means of identifying requesting and/or receiving user information. The cohort identifier 634 includes one or more algorithms or functions for determining clients that are cohorts to a user based on attributes of the user and clients and/or based on the process to be completed by the user or by an expert.

The cohort time estimation module 636 facilitates provided cohort information and an identification of a process or stage of a process to an ML model, such as time inference model 638 or another or another machine learning trained to infer completion times for a process based on cohort information.

In embodiments, the reward module 640, generates or provides to a used a celebration or reward, such as a reward screen, image, video, sound, text, badge, icon, a digital item and/or the like. In some cases, the reward module 640 may facilitate a user providing feedback to an expert during or after a stage of a process. The prompting module 642 may include operations which notify a user when a process is likely to take a long (e.g. above-average) time, or when an event listener determines a long time has elapsed since completion of a process or stage of a process. Thus, a user may potentially be reminded or encouraged to complete a lengthy stage of a process. In some cases, the prompting module may provide a tool top, additional detail or explanation about a stage of the process, or additional instruction. In various embodiments, such prompts can be provided to a user based on a duration of time elapsed while a user is at a stage of a process and/or a relatively high inferred cohort completion time for the stage. Such longer time durations may be indicative that a tool tip would be helpful for the stage of the process.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for inferring completion times for processes in a computing application, comprising:

detecting, in the computing application, a process selection event that indicates initiation of a process within a user interface of the computing application on a client device;

retrieving a process completion event environment for the process;

displaying the process completion event environment within the user interface of the computing application on the client device;

determining, based on the process selection event, primary entity data and a cohort entity data set, the primary entity data including data about a primary entity related to the process selection event, and the cohort data set including data about a cohort determined based on having a common attribute with the primary entity and based on having a cohort completion time associated with at least a part of the process;

providing, based on the process selection event, the cohort entity data set and an indication of the process to a machine learning model trained to determine cohort completion times based on input entity and process information;

receiving, from the machine learning model based on the inputs, an inferred completion time for the process; and displaying, in the process completion environment within the user interface of the computing application on the client device a time based on the inferred completion time.

2. The method of claim 1, wherein the cohort data set includes data about a plurality of cohorts determined based on having one or more common attributes with the primary entity and based on having respective cohort completion times associated with one or more components of the process.

3. The method of claim 1, wherein the process comprises a plurality of stages and the inferred completion time is a first inferred completion time for a first stage of the process, the method further comprising: determining a second inferred cohort completion time for a second stage of the process.

4. The method of claim 1, wherein the inferred completion time is a first inferred completion time of a plurality of inferred completion times corresponding to a plurality of completion time percentiles.

5. The method of claim 1, wherein the cohort completion time associated with at least a part of the process comprises an expert completion time for an expert user to complete the process for the cohort.

6. The method of claim 5, further comprising displaying, in a second user interface, the expert completion time, the inferred completion time, and a feedback element.

7. The method of claim 1, comprising displaying a reward prompt based on a comparison of a primary entity completion time and the inferred completion time in the user interface in response to completion of the process.

8. The method of claim 7, wherein the reward prompt includes an indicator of a reward based on comparing a primary entity completion time for a stage of the process with a cohort completion time for the stage of the process.

9. The method of claim 1, wherein the set of information for the primary account comprises account history information, input account information, account selection information, and tracking information.

10. A system for inferring completion times for processes in a computing application, comprising:

a memory having executable instructions stored thereon;

one or more processors configured to execute the executable instructions to cause the system to:

detect, in the computing application, a process selection event that indicates initiation of a process within a user interface of the computing application on a client device;

retrieve a process completion event environment for the process;

display the process completion event environment within the user interface of the computing application on the client device;

determine, based on the process selection event, primary entity data and a cohort entity data set, the primary entity data including data about a primary entity related to the process selection event, and the cohort data set including data about a cohort determined based on having a common attribute with the primary entity and based on having a cohort completion time associated with at least a part of the process;

provide, based on the process selection event, the cohort entity data set and an indication of the process to a machine learning model trained to determine cohort completion times based on input entity and process information;

receive, from the machine learning model based on the inputs, an inferred completion time for the process; and display, in the process completion environment within the user interface of the computing application on the client device a time based on the inferred completion time.

11. The system of claim 10, wherein the cohort data set includes data about a plurality of cohorts determined based on having one or more common attributes with the primary entity and based on having respective cohort completion times associated with one or more components of the process.

12. The system of claim 10, wherein the process comprises a plurality of stages and the inferred completion time is a first inferred completion time for a first stage of the process, the method further comprising: and wherein the one or more processors are further configured to execute the executable instructions to cause the system to determine a second inferred completion time for a second stage of the process.

13. The system of claim 10, wherein the inferred completion time is a first inferred cohort-completion time of a plurality of inferred completion times corresponding to a plurality of completion time percentiles.

14. The system of claim 10, wherein cohort completion time associated with at least a part of the process comprises a completion time for an expert user to complete the process for the cohort.

15. The system of claim 14, wherein executing the instructions further causes the system to: display, in a second user interface, the expert completion time, the inferred completion time, and a feedback element.

16. The system of claim 14, wherein executing the instructions further causes the system to: display a reward prompt based on a comparison of a primary entity completion time and the inferred completion time in the user interface in response to completion of the process.

17. The system of claim 16, wherein the reward prompt includes an indicator of a reward based on comparing a primary entity completion time for a stage of the process with a cohort completion time for the stage of the process.

18. The system of claim 10, wherein the set of information for the primary account comprises account history information, input account information, account selection information, and tracking information.

19. A non-transitory computer-readable medium comprising instructions that, when executed by one or more processors, perform a method for inferring completion times for processes by causing the processor to:

detect, in a computing application, a process selection event that indicates initiation of a process within a user interface of the computing application on a client device;

retrieve a process completion event environment for the process;

display the process completion event environment within the user interface of the computing application on the client device;

determine, based on the process selection event, primary entity data and a cohort entity data set, the primary entity data including data about a primary entity related to the process selection event, and the cohort data set including data about a cohort determined based on having a common attribute with the primary entity and based on having a cohort completion time associated with at least a part of the process;

provide, based on the process selection event, the cohort entity data set and an indication of the process to a machine learning model trained to determine cohort completion times based on input entity and process information;

receive, from the machine learning model based on the inputs, an inferred completion time for the process; and display, in the process completion environment within the user interface of the computing application on the client device a time based on the inferred completion time.

20. The non-transitory computer-readable medium of claim 19, wherein the cohort completion time associated with at least a part of the process comprises an expert completion time for an expert user to complete the process for the cohort, and the instructions further cause the processor to display the expert completion time, the inferred completion time, and a feedback element.

\* \* \* \* \*